US012507030B2

(12) United States Patent
Filimonov et al.

(10) Patent No.: US 12,507,030 B2
(45) Date of Patent: Dec. 23, 2025

(54) METHOD AND SYSTEM FOR GENERATING A PERSONALIZED FREE FIELD AUDIO SIGNAL TRANSFER FUNCTION BASED ON FREE-FIELD AUDIO SIGNAL TRANSFER FUNCTION DATA

(71) Applicant: HARMAN INTERNATIONAL INDUSTRIES, INCORPORATED, Stamford, CT (US)

(72) Inventors: Andrey Viktorovich Filimonov, Kamenki (RU); Mikhail Sergeevich Kleshnin, Nizhny Novgorod (RU); Andrey Igorevich Epishin, Nizhny Novgorod (RU); Joy Lyons, Lake Forest Park, WA (US)

(73) Assignee: Harman International Industries, Incorporated, Stamford, CT (US)

( * ) Notice: Subject to any disclaimer, the term of this patent is extended or adjusted under 35 U.S.C. 154(b) by 193 days.

(21) Appl. No.: 18/259,930

(22) PCT Filed: Dec. 30, 2021

(86) PCT No.: PCT/US2021/065623
§ 371 (c)(1),
(2) Date: Jun. 29, 2023

(87) PCT Pub. No.: WO2022/147206
PCT Pub. Date: Jul. 7, 2022

(65) Prior Publication Data

US 2024/0089690 A1 Mar. 14, 2024

(30) Foreign Application Priority Data

Dec. 31, 2020 (RU) ........................... RU2020144263

(51) Int. Cl.
*H04S 7/00* (2006.01)

(52) U.S. Cl.
CPC .............. *H04S 7/304* (2013.01); *H04S 7/301* (2013.01); *H04S 2420/01* (2013.01)

(58) Field of Classification Search
CPC ....... H04S 7/304; H04S 7/301; H04S 2420/01
(Continued)

(56) References Cited

U.S. PATENT DOCUMENTS

2008/0137870 A1* 6/2008 Nicol ...................... H04S 7/301 381/17
2010/0290636 A1 11/2010 Mao et al.
(Continued)

FOREIGN PATENT DOCUMENTS

JP 2020-170938 A 10/2020
WO 2016/023581 A1 2/2016

OTHER PUBLICATIONS

Zhang et al., "Individual Distance-Dependent HRTFS Modeling Through a Few Anthropometric Measurements", IEEE International Conference on Acoustics, Speech and Signal Processing, May 4, 2020, 5 pages.
(Continued)

*Primary Examiner* — Paul Kim
(74) *Attorney, Agent, or Firm* — Artegis Law Group, LLP

(57) ABSTRACT

It is described a computer implemented method for generating a personalized sound signal transfer function, the method comprising: determining first data, wherein the first data represents a first sound signal transfer function, wherein the first sound signal transfer function is associated with a user's ear and with a first sound signal direction relative to the user's ear; determining, based on the first data, second data, wherein the second data represents a second sound signal transfer function, wherein the second sound signal transfer function is associated with the user's ear and with a second sound signal direction relative to the user's ear.

20 Claims, 4 Drawing Sheets

(58) Field of Classification Search
USPC .............................................................. 381/1
See application file for complete search history.

(56) References Cited

U.S. PATENT DOCUMENTS

| | | | |
|---|---|---|---|
| 2020/0178014 | A1 | 6/2020 | Kim et al. |
| 2020/0374647 | A1 | 11/2020 | Cappello et al. |

OTHER PUBLICATIONS

Kestler et al., "Head Related Impulse Response Interpolation and Extrapolation Using Deep Belief Networks", International Conference on Acoustics, Speech and Signal Processing, 2019, pp. 266-270.

* cited by examiner

METHOD AND SYSTEM FOR GENERATING A PERSONALIZED FREE FIELD AUDIO SIGNAL TRANSFER FUNCTION BASED ON FREE-FIELD AUDIO SIGNAL TRANSFER FUNCTION DATA

CROSS-REFERENCE TO RELATED APPLICATIONS

This present application is a national stage application of the international application titled "Method and System for Generating a Personalized Free Field Audio Signal Transfer Function Based on Free-Field Audio Signal Transfer Function Data," filed on Dec. 30, 2021, and having application number PCT/US2021/065623 which claims priority benefit of Russian Patent Application titled, "Method and System for Generating a Personalized Free Field Audio Signal Transfer Function Based on Free-Field Audio Signal Transfer Function Data," filed on Dec. 31, 2020, and having Serial No. 2020144263. The subject matter of these related applications are hereby incorporated herein by reference.

BACKGROUND OF THE INVENTION

The acoustic perception of a sound signal may be different for every human being due to its biological listening apparatus: Before a sound signal transmitted around a listener hits the eardrum of the listener, it is reflected, partially absorbed and transmitted by the body or parts of the body of the listener, for example by the shoulders, bones or the ear pinna of the listener. These effects result in a modification of the sound signal. In other words, rather than the originally transmitted sound signal, a modified sound signal is received by the listener.

The human brain is able to derive from this modification a location from which the sound signal was originally transmitted. Thereby, different factors are taken into account comprising (i) an inter-aural amplitude difference, i.e., an amplitude difference of the sound signals received in one ear compared to the other ear, (ii) an inter-aural time difference, i.e., a difference in time at which the sound signal is received in one ear compared to the other ear, (iii) a frequency or impulse response of the received signal, wherein the response is characteristic of the listener, in particular of the listener's ear, and of the location, in particular of the direction, the sound signal is received from. The relation between a transmitted sound signal and the sound signal received in a listener's ear can be described, taking into account the above mentioned factors, by a function usually referred to as a Head Related Transfer Function (HRTF).

This phenomenon can be used to emulate sound signals that are seemingly received from a specific direction relative to a listener or a listener's ear by sound sources located in directions relative to the listener or the listener's ear that are different from said specific direction. In other words, a HRTF can be determined that describes the modification of a sound signal transmitted from a specific direction when received by the listener, i.e. within the listeners ear. Said transfer function can be used to generate filters for changing the properties of subsequent sound signals transmitted from a direction different from the specific direction such that the received subsequent sound signals are perceived by the listener as being received from the specific direction. Put in yet another way: An additional sound source located at a specific location and/or in a specific direction can be synthesized. Hence, an appropriately generated filter being applied to the sound signal prior to the transmittal of the sound signal through fixed positions speakers, e.g. headphones, can make the human brain perceive the sound signal as having a certain, in particular selectable, spatial location.

In order to determine a respective HRTF for every possible direction relative to the listener, more precisely relative to each of the listener's ear, may be very cost and time consuming. Thereby, determining a frequency or impulse response that is characteristic of the listener or the listener's ear and of the direction the sound signal comes from is particularly challenging. In addition, when performed in laboratory conditions, for example in an anechoic room, only a limited number of transfer functions for a specific listener may be generated within a reasonable time and cost frame.

The present invention solves the problem of generating, in a time- and cost-effective manner, a personalized sound signal transfer functions, e.g. a frequency or impulse response for a HRTF, associated with a user's ear, each of the sound signal transfer functions being associated with a respective sound signal direction relative to the user's ear.

SUMMARY

According to one embodiment, there is provided a computer implemented method for generating a personalized sound signal transfer function, the method comprising: determining first data, wherein the first data represents a first sound signal transfer function, wherein the first sound signal transfer function is associated with a user's ear and with a first sound signal direction relative to the user's ear; determining, based on the first data, second data, wherein the second data represents a second sound signal transfer function, wherein the second sound signal transfer function is associated with the user's ear and with a second sound signal direction relative to the user's ear.

The first and second sound signal transfer functions may be frequency or impulse responses for first and second HRTFs, both associated with the user's ear, respectively. In that manner, only the first sound signal transfer function needs to be measured, for example in a laboratory environment. The second sound signal transfer function or a plurality of further second sound signal transfer functions may be determined based on the measured first sound signal transfer function. In other words, the first data may be first input data, the second data may be generated or inference data.

The second sound signal transfer function may suitable for modifying the sound signal or a subsequent sound signal. E.g., using the first or second HRTFs, the sound signal or the subsequent sound signal may be modified, i.e., customized, for personalized spatial audio processing. Further, only a part of the first and/or second HRTF may be used, for example a frequency response for certain directions, i.e., angles or combinations of angles, to create custom equalization or render a personalized audio response for enhanced sound quality.

Alternatively, or additionally, the first and/or second HRTF can be used as information to disambiguate a device response from the HRTF, in particular the first HRTF, to enhance signal processing, such as ANC (Active Noise Cancellation), passthrough or bass-management in order to make said signal processing more targeted and/or effective.

According to an embodiment, the computer implemented method further comprises: receiving, by a sound receiving means, a sound signal at or in a user's ear, wherein determining the first data is based on the received sound signal.

The sound receiving means may be a microphone. The microphone may be configured, in particular be small enough, to be located in an ear channel of the user's ear. In other words, the microphone may acoustically block the ear channel. Alternatively, the microphone may pe located at or in proximity of the user's ear.

The sound signal may be transmitted by a sound source located within a near field relative to the user's ear. For example, the sound signal may be transmitted by headphones worn by the user. In this case, a near field sound signal transfer function may be determined based on the received sound signal. Alternatively, the sound signal may be transmitted by a sound source located around the user in the first sound signal direction within a far field or free field relative to the user's ear, for example a loudspeaker of a (multi channel) surround sound system. In this case, a far field or free field sound signal transfer function may be determined based on the received sound signal.

According to an embodiment, the first sound signal transfer function represents a first far field or a first free field sound signal transfer function associated with a first sound signal direction; and/or the method further comprises receiving the sound signal from the first sound signal direction or a first sound transmitting means located in the first sound signal direction within a far field or free field relative to the user's ear.

As an alternative to the measurement of the first data, the first data may itself be determined based on initial data. The initial data may, for example, represent a near field sound signal transfer function extracted from the sound signal received from a sound source located within the near field. Alternatively, the first sound signal transfer function may be determined based on, e.g., extracted from, the sound signal received from a sound source located within the far field or free field.

For example, the first sound transmitting means may be a loudspeaker, in particular one or more of a plurality of loudspeakers, located around the user in the first sound signal direction within a far field or free field, for example a loudspeaker of a (multi channel) surround sound system. Alternatively, the loudspeaker may be a loudspeaker of a setup in a laboratory environment, such as an anechoic room. The user may be located within the far field or free field relative to the loudspeaker. The user may be positioned at a predetermined or known distance relative to the loudspeaker. The microphone and the loudspeaker may be communicatively coupled with each other or be each communicatively coupled with a computing device or a server.

After the microphone has been placed in the ear channel, the microphone may receive any sound signal or reference sound signal transmitted by the sound transmitting means. These steps can be repeated for both ears of the user. For each ear, a respective far field or free field sound signal transfer function can be extracted from the sound signal received by the microphone.

According to an embodiment, the second sound signal transfer function represents a second far field or second free field sound signal transfer function. The second sound signal transfer function may be selected, based on the first data, from a data base comprising a plurality of far field or free field sound signal transfer functions associated with the second sound signal direction. In that manner, a second sound signal transfer function may be selected that corresponds or corresponds best to a real far field or free field sound signal transfer function associated with the user's ear and the second sound signal direction, or more generally, associated with the set up comprising the user's ear, the loudspeaker and the microphone. Alternatively, the second sound signal transfer function may be generated based on the first data, for example via a neural network model.

Thereby, a sound signal to be subsequently transmitted can be modified, using the second sound signal transfer function, to evoke the user's impression of the subsequent audio signal being received within a far field or free field relative to the users ear. Hence, an improved sound perception can be achieved.

According to an embodiment, the computer implemented method further comprises: determining third data, wherein the third data is indicative of the first and/or second sound signal direction in relation to the user's ear, and wherein determining the second data is further based on the third data. In other words, the third data may be second input data.

The first sound signal direction may be predetermined or known by the system performing the method, for example by data processing system 300, in particular by computing means 330. The first sound signal direction may be indicated by the user to the system or may be determined by the system, e.g. via one or more sensors comprised by the microphone and/or the loudspeakers.

The second sound signal direction may be indicated by the user, the system or may be indicated by metadata of a sound signal to be transmitted, e.g. a music file. By determining the second data based on the third data, a sound signal to be transmitted can be modified, such that a user's impression of the audio signal being received from a certain direction within a free field relative to the users ear is evoked. In that manner, sound or music perception of a user can be further improved by simulating or synthesising one or more sound signal sources located at different locations in relation to the user's ear, when only a limited number of sound signal sources located in a corresponding limited number of locations in relation to the user's ear are available, for example one or more loudspeakers of a surround sound system. Hence, a "surround sound perception" may be achieved using only a limited number of sound sources.

According to an embodiment, the computer implemented method further comprises: prior to receiving the sound signal, transmitting, by a sound transmitting means, the sound signal; and/or determining, based on the second data, a filter function for modifying the sound signal and/or a subsequent sound signal; and/or transmitting, by the sound transmitting means, the modified sound signal and/or the modified subsequent sound signal.

The filter function may be a filter, such as a finite impulse response (FIR) filter. The filter function may modify the sound signal in the frequency domain and/or in the time domain. A sound signal in the time domain can be transformed to a sound signal in the frequency domain, e.g. an amplitude and/or phase spectrum of the sound signal, and vice versa, using a time-to-frequency domain transform or frequency-to-time domain transform, respectively. A time-to-frequency domain transform may be a Fourier transform or a Wavelet transform. A frequency-to-time transform may be an inverse Fourier transform or an inverse Wavelet transform. The filter function may modify an amplitude spectrum and/or a phase spectrum of the sound signal or a part of the sound signal and/or a frequency-to-time transform thereof and/or a time delay with which the sound signal or a part of the sound signal is transmitted.

According to an embodiment, the second data is determined using an artificial intelligence based, or machine learning based, regression algorithm, preferably a neural network model, in particular wherein the first data and/or the third data are used as inputs of the neural network model.

The terms "artificial intelligence based regression algorithm" or "machine learning based regression algorithm" and the term "neural network model" are, where appropriate, used interchangeably herein.

Using a neural network model, a personalized sound signal transfer function, e.g., a frequency response of a free field HRTF for a particular direction associated with a particular ear of particular user can be precisely generated (rather than chosen from a plurality of sound signal transfer functions) based on a frequency response of far field or free field HRTF data associated with this particular ear, wherein said data can be collected by the user him/herself at home. Inputs of the neural network may therefore be the first data, the first sound signal direction and the second sound signal direction, i.e. the (second) sound signal direction for which a far field or free field sound signal transfer function is to be determined or synthesized.

According to an embodiment, the computer implemented method further comprises, in a training process, a computer implemented method for initiating and/or training the regression algorithm. If not already otherwise obtained, performing a training process may result in a trained neural network model that can be used to determine the second data.

According to another aspect of the invention, there is provided a computer implemented method for initiating and/or training a neural network model, the method comprising: determining a training data set, wherein the training data set comprises a plurality of first training data and a plurality of second training data; and initiating and/or training the neural network, based on the training data set, to output a second sound signal transfer function associated with a user's ear based on an input first sound signal transfer function associated with the user's ear; wherein each of the plurality of first training data represents a respective first training sound signal transfer function associated with a training subject's or a training user's ear or a respective training user's ear; and wherein each of the plurality of second training data represents a respective second training sound signal transfer function associated with the training user's ear or the respective training user's ear.

The training subject may be a training user, a training model, training dummy or the like. The terms training subject and training user are used interchangeably herein. The training data set may be collected or determined in a laboratory environment, such as an anechoic room. Each of the plurality of first and second training data may be associated with a specific ear of a specific training user. During the training process, the neural network model may allocate properties of the first training data to properties of the second training data, such that a trained neural network model may be configured to derive, from the first training data, the second training data or an approximation of the second training data and/or vice versa. The collected training data set may comprise a training subset that is used to train the neural network model and a test subset that is used to test and evaluate the trained neural network model.

New first and second training data, e.g., comprised by the test subset of training data, that have not yet been used during the training process, may be used to evaluate the quality or accuracy of the model. The new first training data may be used as an input of the model, the new second training data may be used for comparison with the output of the model in order to determine an error, e.g., an error value.

According to an embodiment, each of the respective first training sound signal transfer functions represents a respective first far field or free field sound signal transfer function associated with a first training sound signal direction or a respective first training sound signal direction, in particular wherein the input first sound signal transfer function represents an input first far field or first free field sound signal transfer function associated with an input first sound signal direction.

According to an embodiment, each of the respective second training sound signal transfer functions represents a respective second far field or free field sound signal transfer function associated with a second training sound signal direction or a respective second training sound signal direction, in particular wherein the output second sound signal transfer function represents an output second far field or second free field sound signal transfer function associated with an input second sound signal direction.

The first and second training data may be determined, e.g. collected or generated, based on a respective sound signal received by a microphone located in or in proximity of the training user's ear channel. The sound received by the microphone may be transmitted by sound transmitting means located within the far field or free field of the training user. For example, each respective second training sound signal is transmitted by a respective one of a plurality of sound transmitting means located in a respective direction within the far field or free field relative to the training user's ear. For example, the training user is surrounded by these sound transmitting means. The sound transmitting means may be part of a setup in an anechoic room. In other words, the sound signals transmitted by the sound transmitting means receive the training user's ear non-reflected.

According to an embodiment, the training data set further comprises third training data, wherein the third training data is indicative of the, or the respective, first and/or the, or the respective, second training sound signal directions; and wherein initiating and/or training the neural network to output the second sound signal transfer function is further based on an, or the, input first and/or second sound signal direction. In other words, the model is trained to output an output second sound signal transfer function that is associated with a sound signal direction, i.e., an output sound signal direction, said sound signal direction being used as an input of the model.

The third training data may indicate, for each first and second training data, from which direction the sound signal was received relative to the user's ear. In that manner, the neural network model may allocate properties of a received training sound signal or a frequency or impulse response of the training sound signal to the direction from which the training sound signal is received.

Thereby, a trained neural network model may be configured to output an output far field or free field frequency response associated with a specific direction based on first, second and third input data, the first input data representing an input far field or free field frequency response, the second input data representing the sound signal direction associated with the input far field or free field frequency response, the third input representing the specific direction associated with the output far field or free field frequency response.

According to an embodiment, the computer implemented method for initiating and/or training a neural network model further comprises: receiving a plurality of first training sound signals in or at the training user's ear from a or a respective first sound transmitting means located in the or the respective first training sound signal direction within the first far field or first free field relative to the training user's ear; and determining, based on each of the received plurality of first training sound signals, the respective first training sound signal transfer functions; and/or receiving the second training sound signal in or at the training user's ear from a or a respective second sound transmitting means located in the or the respective second training sound signal direction within the second far field or second free field relative to the training user's ear; and determining, based on each of the received plurality of second training sound signals, the respective second training sound signal transfer functions.

The first far field or first free field may correspond to the second far field or second free field. In other words, the first sound transmitting means and the second sound transmitting means may be located at the same or approximately the same distance relative to the user or the user's ear. Alternatively, the first sound transmitting means may be located at a first distance and the second sound transmitting means may be located at a second distance relative to the user or the user's ear. The third training data may further be indicative of the first and second distance.

According to an embodiment, the third training data comprises first vector data being indicative of the first training sound signal direction and/or the second training sound signal direction, i.e. output training sound signal direction, i.e. training sound signal direction associated with the second training data or a respective second training sound signal transfer function; and wherein the third training data comprises second vector data, wherein the second vector data is dependent on, in particular derived from, the first vector data.

The third training data may comprise a respective vector comprising respective vector data for each of the first and second sound signal direction. A first and a second vector may represent a cartesian or spherical first and second vector, respectively. The second vector data may be used to extend the first vector data. For example, the first and a second vector may represent a three dimensional cartesian first and second vector, respectively, each having three vector entries The second vector data may be used to transfer the first vector from a three dimensional vector to a six dimensional vector. The first vector may be parallel or antiparallel to the second vector. The entries of the second vector may represent the absolute values and/or factorized values of the entries of the first vector. Alternatively, or additionally, the third data may comprise a zero vector, in particular a zero vector of the same dimension than the first vector, instead of the first vector.

By introducing one or more second vector data, e.g. by introducing one or more extended vectors, a direction vector-based data flow parallelization is created. Thereby, one or more parallel layers, or sections thereof, may be used in the neural network model architecture. In particular, in the training process, the model may be trained via a comparison of different model outputs based on extended vectors, i.e. different direction data. Thereby, the model may be enhanced, e.g. a better convergence of the model may be achieved.

According to another aspect of the invention, there is provided a data processing system comprising means for carrying out the computer implemented method for generating a personalized sound signal transfer function and/or the computer implemented method for initiating and/or training a neural network model.

According to another aspect of the invention, there is provided a computer-readable storage medium comprising instructions which, when executed by the data processing system, cause the data processing system to carry out the computer implemented method for generating a personalized sound signal transfer function and/or the computer implemented method for initiating and/or training a neural network model.

The present invention may be better understood from reading the following description of non-limiting embodiments, with reference to the attached drawings.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

DETAILED DESCRIPTION OF THE PREFERRED EMBODIMENTS

Figure 1:
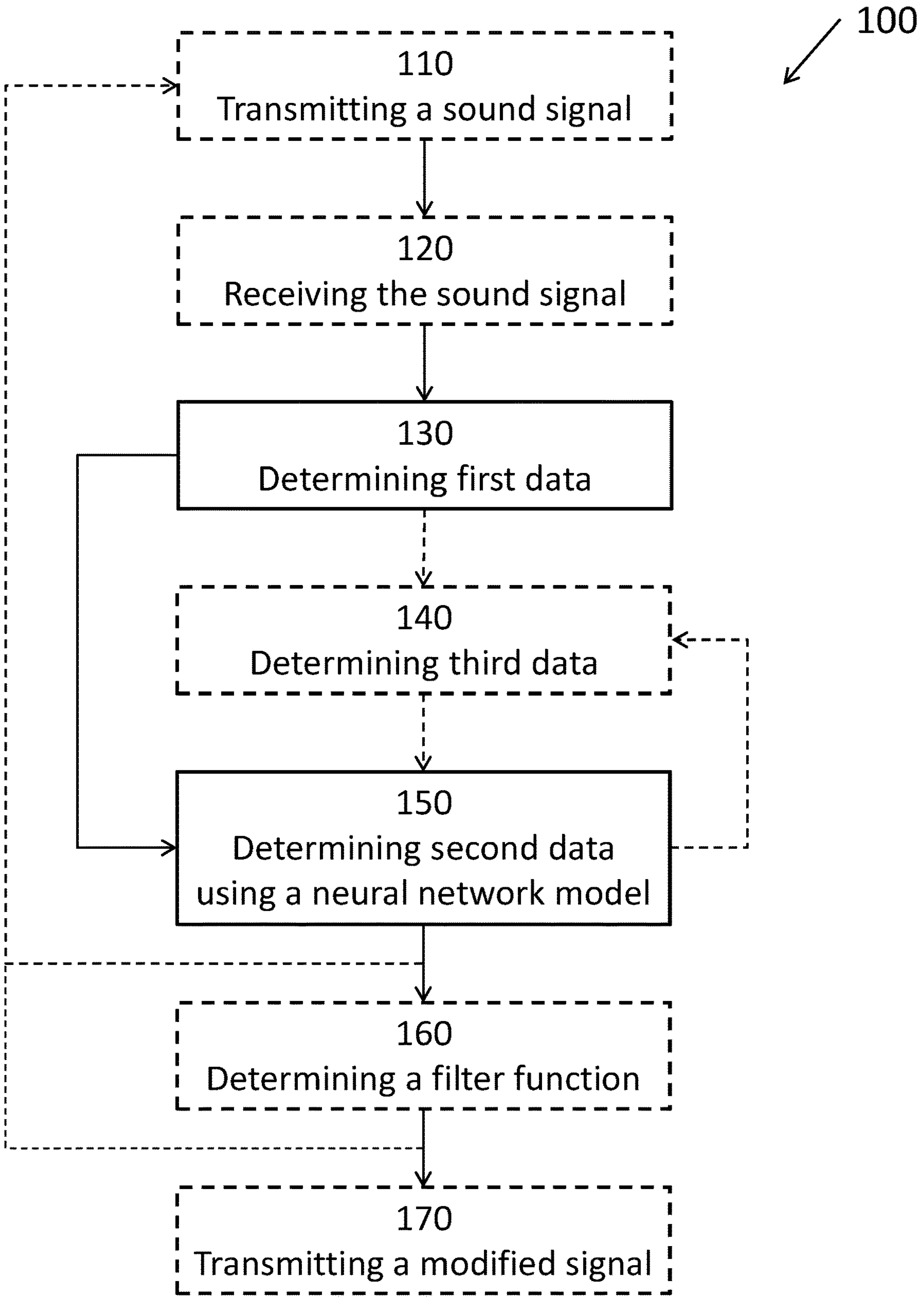
FIG. 1 shows a flowchart of a method for generating a personalised sound signal transfer function.

FIG. 1 shows a flowchart describing a method 100 for generating a personalised sound signal transfer function. Optional steps are indicated via dashed lines. The method 100 is at least in part computer implemented. The method 100 may start in step 110 by transmitting a sound signal. The sound signal is a known sound signal, in particular the frequency spectrum of the sound signal is known. The sound signal may be a reference sweep, e.g., a log-sine sweep, representing a number of, in particular a continuous distribution of, sound signal frequencies.

The sound signal may be transmitted by a sound source located within a far field or free field relative to a user's ear. For example, the sound signal is transmitted by a sound source, e.g., one or more loudspeakers arranged around the user. In particular, the sound source may be located at a specific distance and in a specific direction relative to the user's ear. The sound source may be the sound transmitting means 310 of the data processing system 300 shown in FIG. 3.

In step 120, the sound signal transmitted in step 110 is received at or in a user's ear. The sound signal may be received by sound receiving means, such as a microphone, positioned in the user's ear, for example in the ear canal of the user's ear, more particularly in proximity of the eardrum, ear canal, or pinnae of the user's ear. Alternatively, the sound receiving means may be positioned at or in proximity of the user's ear The sound signal may be received from a first sound signal direction relative to the user's ear. The sound receiving means may be the sound receiving means 320 of the data processing system 300 shown in FIG. 3.

In step 130, based on the received sound signal, first data is determined that represents a first sound signal transfer function associated with the user's ear. Alternatively, the first data may be determined differently, i.e. with or without performing method steps 110 and 120. For example, the first data may be received from an external component. The first data may further be determined based on initial data representing an initial sound signal transfer function. For example, the initial transfer function is a near field transfer function. The near field transfer function may be determined based on a sound signal received from a sound source located in a near field relative to the user's ear, e.g., headphones worn by the user. The initial sound signal transfer function may be extracted from the received sound signal. The first sound signal transfer function may be a far field or free field sound signal transfer function. The first sound signal transfer function may be determined based on the initial (near field) sound signal transfer function. Said determination may be performed, for example, by an accordingly trained neural network model. The neural network model and the training process of the neural network model may be structured or trained similar the neural network model and the training process described below, e.g., by replacing the first (training) far field or free field sound signal transfer function with a (training) near field sound signal transfer function.

In general, the term "sound signal transfer function" as used herein may describe a transfer function in the frequency domain or an impulse response in the time domain. The transfer function in the time domain may be an impulse response, in particular a Head Related Impulse Response (HRIR). The transfer function in the frequency domain may be a frequency response, in particular a Head Related Frequency Response (HRFR). The term "frequency response" as used herein may describe an amplitude response, a phase response or both the amplitude and the phase response in combination. In the following, when the term "frequency response" is used, a frequency response or an impulse response is meant. In general, a frequency response of a HRTF as representation of a HRIR in the frequency domain can be obtained by applying a time-to-frequency transformation to the HRIR.

In general, a sound signal transfer function may be determined, e.g. extracted, by comparing the transmitted sound signal and the received sound signal. In other words, a sound signal transfer function may be independent, i.e. distinguished from, of the transmitted or received sound signal. The sound signal transfer function may instead be characteristic of the user's ear at or in which the sound signal is received.

Referring again to step 130, the first sound signal transfer function may be extracted from the received sound signal, i.e., the sound signal received by the sound receiving means in step 120. The extraction of the transfer function may further be based on a comparison of the sound signal received by the sound receiving means in step 120 and the sound signal transmitted by the sound transmitting means in step 120. The comparison may be performed within a certain frequency range, in particular within a frequency range covered by the reference sweep. The first sound signal transfer function may further be associated with the first sound signal direction relative to the user's ear.

As mentioned above, the sound signal was transmitted in step 110, for example, within a far field or free field relative to the user's ear. Thus, the first sound signal transfer function may be a far field or first free field sound signal transfer function, i.e., a first far field or free field frequency response. In general, a sound signal transfer function associated with a user's ear may depend on the distance between the sound transmitting means and the user's ear. In other words, a sound signal transfer function associated with a user's ear may depend on whether the sound signal was transmitted from a sound source located within a near field, a far field or a (approximated) free field relative to a user's ear.

A sound source located within a near field relative to the user's ear may be located relatively close to, or in proximity of, the user's ear. A sound source located within a far field relative to the user's ear may be located relatively far away from the user's ear. A sound source located within a (or an approximated) free field may be a sound signal located within a far field where no (or almost/approximately no, or at least fewer or relatively few) sound reflections occur. When the term "free field" is used, a free field or an approximated free field is meant. Where appropriate, the terms "free field", "approximated free field" and "far field" may be used interchangeably herein. A sound source located within a near field/free field relative to the user's ear corresponds to a user's ear located within a near field/free field relative to the sound source.

In addition, the sound signal transfer function associated with the user's ear may be dependent on a direction within the near field, the far field or the free field relative to the user's ear. The sound signal transmitted within the far field or free field in step 110 may be transmitted at, or approximately at, an elevation angle and an azimuth angle of zero degree (0°), respectively, relative to the user's ear or relative to a reference axis, the reference axis comprising, for example, two points representing a reference point, the centre of or the eardrum of one of the user's ear, respectively. Alternatively, the sound signal transmitted within the far field or free field in step 110 may be transmitted at, or approximately at, an elevation angle and/or an azimuth angle different from zero degrees.

The first data, i.e., the first sound signal transfer function or the first frequency response associated with the user's ear may be determined by computing means, for example, the computing means 330 of the data processing system 300, wherein the computing means 330 may be communicatively coupled with the sound transmitting means 310 and/or the sound receiving means 320.

In step 150, based on the determined first data, second data is determined. The second data may be determined, in particular generated, by the computing means 330, in particular by a neural network module 331 of the computer means 330. The second data represents a second sound signal transfer function associated with the user's ear. The second sound signal transfer function may be different from the first sound signal transfer function. The second sound signal transfer function may be a second far field or free field sound signal transfer function, or an approximation of a far field or free field sound signal transfer function, associated with the user's ear. In other words, in step 150, a second far field or free field frequency response associated with the user's ear is determined based on a first far field or free field frequency response associated with the user's ear. Said determination may be performed using a neural network model that may be trained using the training method 200, as described with reference to FIG. 2.

The second sound signal transfer function may further be associated with a second sound signal direction relative to the user's ear that is different from the direction from which the sound signal was received in step 120, i.e. from the first sound signal direction. The second sound signal direction may be generated or determined or predetermined by the computing means, for example the computing means 330 shown in FIG. 3.

The second data, i.e. the second sound signal transfer function, associated with the second sound signal direction may be determined based on third data, wherein the third data is indicative of the second sound signal direction and may also be indicative of the first sound signal direction. The third data indicative of the first and/or second sound signal direction may be predetermined or may optionally be determined in step 140 prior to the determination of the second data in step 150.

After having determined the second data in step 150 associated with the second sound signal direction, subsequent second data may be determined based on further, or subsequently determined, third data and the determined first data, i.e. the determined first sound signal transfer function. In other words, a set of second data may be determined based on the first data determined in step 130, wherein the set of second data comprises a plurality of respective second data. The respective second data may each be associated with respective third data. The respective third data may each be indicative of a respective, in particular a respective different, second sound signal direction. Put in another way, a set of second data may be determined by repeating steps 140 and 150, wherein in each repetition, different second and/or third data are determined. For example, in each repetition, different third data are determined, e.g. by the user. The determination of the different third data then results in a determination of different second data.

Optionally, in step 160, a filter function, in particular a filter, for example an FIR (Finite Impulse Response)-Filter, is determined, in particular generated. The filter function is determined based on the second data, in particular based on the second data and the first data. In other words, the filter function may be determined based on the generated second far or free field frequency response and the determined first far or free field frequency response. The filter function may be applied to the sound signal transmitted in step 110 or any other, e.g., subsequent sound signals. When applying the filter function to a sound signal, characteristics, in particular a frequency spectrum of the sound signal or an impulse distribution in time, are changed. When transmitting the changed sound signal, a modified changed sound signal (modified by the body of the user as explained above) is received in the user's ear. The received modified changed sound signal evokes the impression, of the user, that the sound signal is received from a sound source located in the sound signal direction associated with the second sound signal transfer function. In other words, the modified changed sound signal may correspond or approximately correspond to another modified sound signal received in the user's ear that is received from another sound source located in said sound signal direction. In other words, by applying the filter function to the sound signal, the modification of the sound signal via the body of the user as describe above is emulated or virtualized, such that the sound signal—modified by parts of body—is perceived as being modified via other parts of the body and thus as being received from a specific, in particular different, direction.

In step 170, the modified sound signal or the modified subsequent sound signal may be transmitted. The modified sound signal or the modified subsequent sound signal may be transmitted by the sound source from which the sound signal was originally received, e.g., the sound transmitting means 310 of the data processing system 300 shown in FIG. 3.

The method 100 or part of the method 100, in particular steps 130 and 150, may be performed for both a user's first ear and a user's second ear. In that manner two sets of second data, each associated with one of the user's first and second ear, respectively, can be obtained. Prior to the method 100, the neural network model used in step 150 to determine the second data is initiated and/or trained during a method for initiating and/or training the neural network model.

Figure 2:
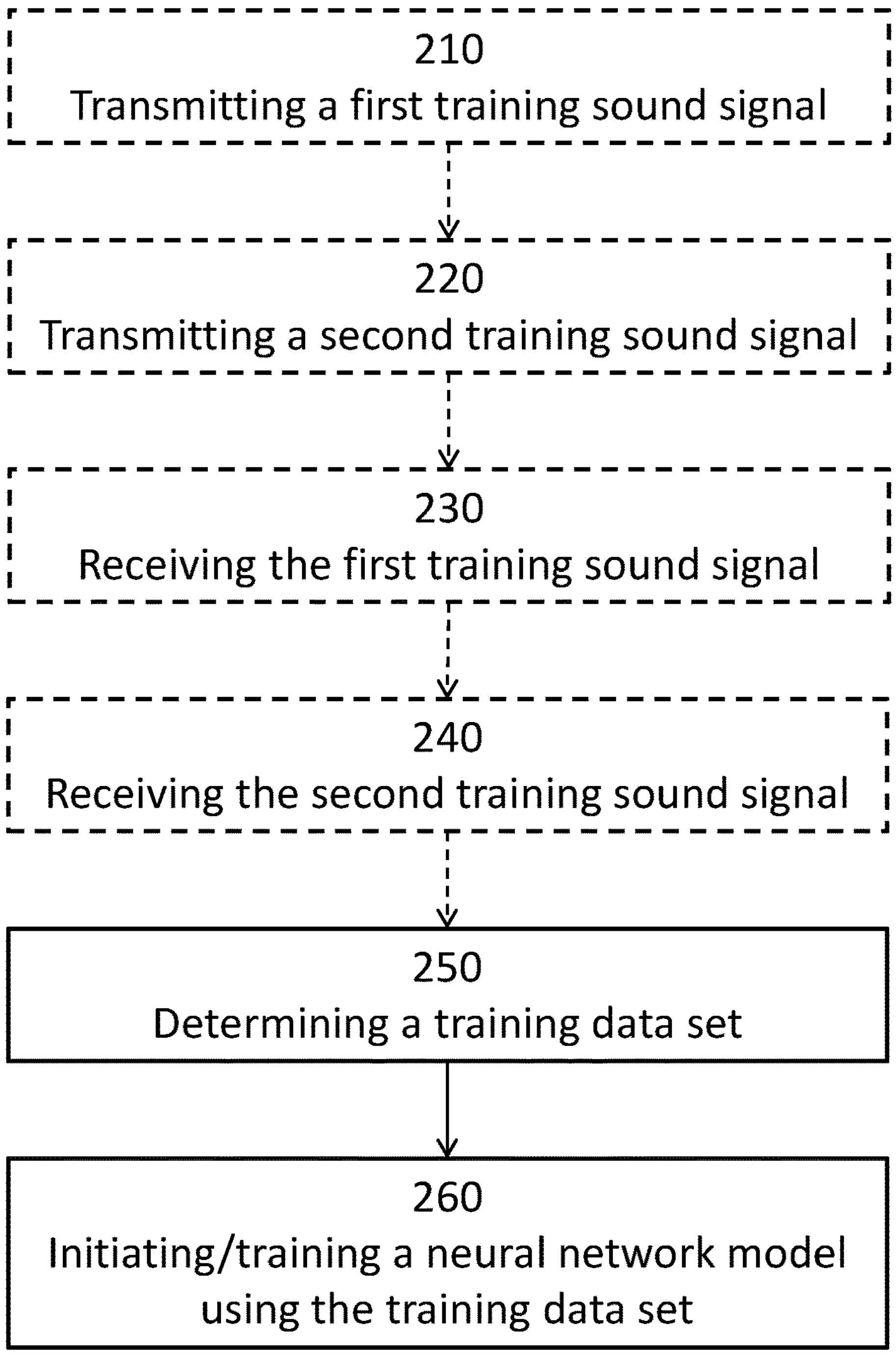
FIG. 2 shows a flowchart of a method for initiating and/or training a neural network model.

FIG. 2 shows a flowchart of a method 200 for initiating and/or training a neural network model. Optional steps are indicated via dashed lines. The neural network model is initiated and/or trained to output a generated sound signal transfer function associated with a specific user's ear based on a first input of the neural network model, wherein the first input is an input sound signal transfer function associated with the specific user's ear, for example the first data determined in step 130 of the method 100. The method 200 may be performed by the data processing system 400 shown in FIG. 4.

The input sound signal transfer function may represent a sound signal transfer function associated with an input first sound signal direction. The neural network model may be initiated and/or trained to output the generated sound signal transfer function further based on the input first sound signal direction.

More particularly, the input sound signal transfer function may represent a first far field or free sound signal transfer function. The input sound signal transfer function may be determined based on a specific sound signal received in or at the specific user's ear, e.g., the sound signal received in step 120 of method 100. The generated sound signal transfer function may represent a second far field or free field sound signal transfer function associated with the same user's ear.

The method 200 starts at step 250. In step 250 a training data set is determined. The training data set comprises a plurality of first training data and a plurality of second training data. In step 260, based on the training data set, the neural network model is initiated and/or trained to output the generated sound signal transfer function based at least on the first input of the neural network model. Method steps 250 and 260 may be performed by computing means 440, in particular by the neural network initiation/training module 441, of the data processing system 400. For example, a basic feed-forward neural network may be used as an initial template.

The plurality of first training data comprises a set of first training data, wherein each of the first training data represents a respective first training sound signal transfer function associated with a training user's ear. Each of the first training sound signal transfer functions may be associated with the same training user's ear or with a respective different training user's ear. For example, the respective first training sound signal transfer functions may be respective far field or free field training sound signal transfer functions, i.e., the respective first training sound signal transfer functions may each represent a respective frequency response or impulse response, in particular a far field or free field frequency response or impulse response. The first training data may be generated in a laboratory environment.

The plurality of second training data comprises a set of second training data, wherein each of the second training data represents a respective second training sound signal transfer function associated with the same training user's or the same respective training user's ear as the corresponding first training sound signal transfer function. Each of the respective second training sound signal transfer functions may represent a respective far field or free field sound signal transfer function. Likewise, the second training data may be determined in a laboratory environment.

Each of the respective first training sound signal transfer functions may be associated with a single first training sound signal direction relative to the training user's ear or a respective first training sound signal direction relative to the training user's ear. Each of the respective second training sound signal transfer functions may be associated with a single second sound signal direction relative to the training user's ear or a respective second training sound signal direction relative to the training user's ear. The training data set may further comprise a plurality of third training data. The third training data may be indicative of the first and second training sound signal directions or the respective first and second training sound signal directions. Initiating and/or generating the neural network model may further be based on the third training data.

The generated sound signal transfer function may be associated with a generated sound signal direction relative to the specific user's ear. The generated sound signal direction may be predetermined or indicated by the specific user or indicated by computing means, for example the computing means 330 of data processing system 300. The computing means may be communicatively coupled with or comprised by the sound transmitting means 310 of data processing system 300 or by one or more loudspeakers surrounding the specific user. Alternatively, the generated direction may be indicated by a sound signal that is to be transmitted via sound transmitting means, for example the sound transmitting means 310 of data processing system 300, or by the loudspeakers surrounding the specific user. The sound signal to be transmitted may be stored by the computing means, in particular by storage 332 comprised by the computing means, and/or received by the computing means from an external component. Further, the first, second and/or third data and/or the neural network model and any other required data, such as a neural network architecture and training tools, may be stored in storage module 332. In addition, a neural network training process, the first and second training signals and/or the first, second and third training data may be stored by the computing means 430, in particular by the storage module 432.

The generated sound signal direction may be a third input of the neural network model. In other words, the neural network model is initiated and/or trained to output the generated sound signal transfer function based on the input generated sound signal direction relative to the specific user's ear. Put in yet another way, the neural network model is initiated and/or trained to output the generated sound signal transfer based on a direction associated with the output sound signal transfer function to be generated. Said direction is used as input for the model, e.g. comprised by the third data.

The training data set may be determined or generated via method steps 210 to 240 preceding method steps 250 and 260, as indicated in FIG. 2. In step 210, a first training sound signal is transmitted. In particular, a plurality of first training sound signals is transmitted. The first training sound signal may be transmitted by a first sound transmitting means, for example the first sound transmitting means 410 of data processing system 400. The first sound transmitting means is located within a far field or free field relative to the training user's ear. The first sound transmitting means is located in a first training direction relative to the training user's ear. The first training direction may be fixed and/or predetermined. The first training direction may represent or be described by an elevation angle and an azimuth angle of zero degree (0°), respectively, relative to the training user's ear or relative to a training reference axis, the training reference axis comprising, for example, two points respectively representing a reference point, the centre of, or the eardrum of, one of the training user's ear.

The first sound transmitting means may be one or more loudspeakers located around the training user, in particular in a laboratory environment, for example an anechoic room.

The first training sound signal may be received in step 230 via sound receiving means or training sound receiving means, for example the sound receiving means 430 of data processing system 400, located in or at the training user's ear, in particular located in proximity of the eardrum, ear canal, or pinnae of the user's ear. The sound receiving means or training sound receiving means, may be a microphone.

In step 220, a second training sound signal, in particular a plurality of second training sound signals, may be transmitted. The second training sound signal may be transmitted by one or more second sound transmitting means or second training sound transmitting means, for example the second sound transmitting means 420 of data processing system 400. The second sound transmitting means may be located within a far field or a free field relative to the training user's ear. The second sound transmitting means may be one or more loudspeakers arranged around the training user, in particular within a laboratory environment, for example an anechoic room.

The one or more second sound transmitting means may be located in one or more second training directions relative to the training user's ear. The second training directions may be fixed and/or predetermined or adjustable. One of the second training directions may be described by an elevation angle and an azimuth angle of zero degree (0°), respectively, relative to the training user's ear or relative to a reference axis, the reference axis comprising, as described above, for example, two points respectively representing a reference point, the centre of, or the eardrum of, one of the training user's ear. The second training directions may represent or be described by an elevation angle and/or an azimuth angle of zero degree (0°), respectively. Alternatively, at least one of the second training directions may represent or be described by an elevation angle and/or an azimuth angle different from zero degree (0°), respectively. The second training directions may gradually cover an elevation angle range and/or an azimuth angle range, in particular between 0 and 360 degrees, respectively.

In step 240, the second training sound signal is received by the sound receiving means or training sound receiving means, for example the sound receiving means 430 of data processing system 400, in or at the training user's ear, in particular located in proximity of the eardrum, ear canal, or pinnae of the user's ear.

Based on the received first training sound signal or the received plurality of first training sound signals, the first training data may be determined in step 250. Based on the received second training sound signal or the received plurality of second training sound signals, the second training data and/or the third training data may be determined in step 250. Alternatively, the third training data may be separately determined by, e.g., indicated to, the training system for example the data processing system 400, in particular the computing means 440 or the neural network initiation/training module 441.

The third training data may comprise first vector data indicative of the first or second training sound signal direction. For example, the first vector data may represent a respective first spherical or cartesian vector for the first or second training sound signal direction. The first vector data may describe a first, n-dimensional vector. Alternatively, or additionally, the third training data may comprise second vector data, in particular wherein the second vector data is dependent on, or derived from, the first vector data. The second vector data may describe a second, m-dimensional vector. More particularly, the first vector may have positive and/or negative vector entries. The second vector may have only positive or only non-negative vector entries. For example, the vector entries of the second vector may be the absolute values of the corresponding vector entries of the first vector. Additionally, or alternatively, the vector entries of the second vector may represented the corresponding vector entries of the first vector multiplied by a factor or respectively multiplied by a respective factor. The first and second vector data may be comprised by a combined vector data describing an (m+n)-dimensional vector. Alternatively, the second vector data and a zero vector may be comprised by the combined (m+n)-vector. Thereby, a convergence process of the neural network model during the training process can be enhanced.

Different optimization algorithms, for example an Adam optimizer, for the neural network model may be used. The initiated and/or trained neural network model may be evaluated using an evaluation training data set. The evaluation training data set may comprise first, second and third training data not yet included in the training process. In particular the first and third training data of the evaluation training data set may be used as inputs of the initiated and/or trained neural network model. The corresponding output of the neural network model may be compared to the second training data of the evaluation training data set. Based on the comparison, an error value of the neural network model may be determined. The determined error value may be compared to an error threshold value. Based on the comparison to the error threshold value, a training model, e.g., the neural network initiation/training module 431 of data processing system 400 may determine whether to continue or to terminate the training process. For example, the training process is continued if the error value exceeds the error threshold value and may be terminated otherwise, i.e., if the error value falls below the error threshold value.

Figure 3:
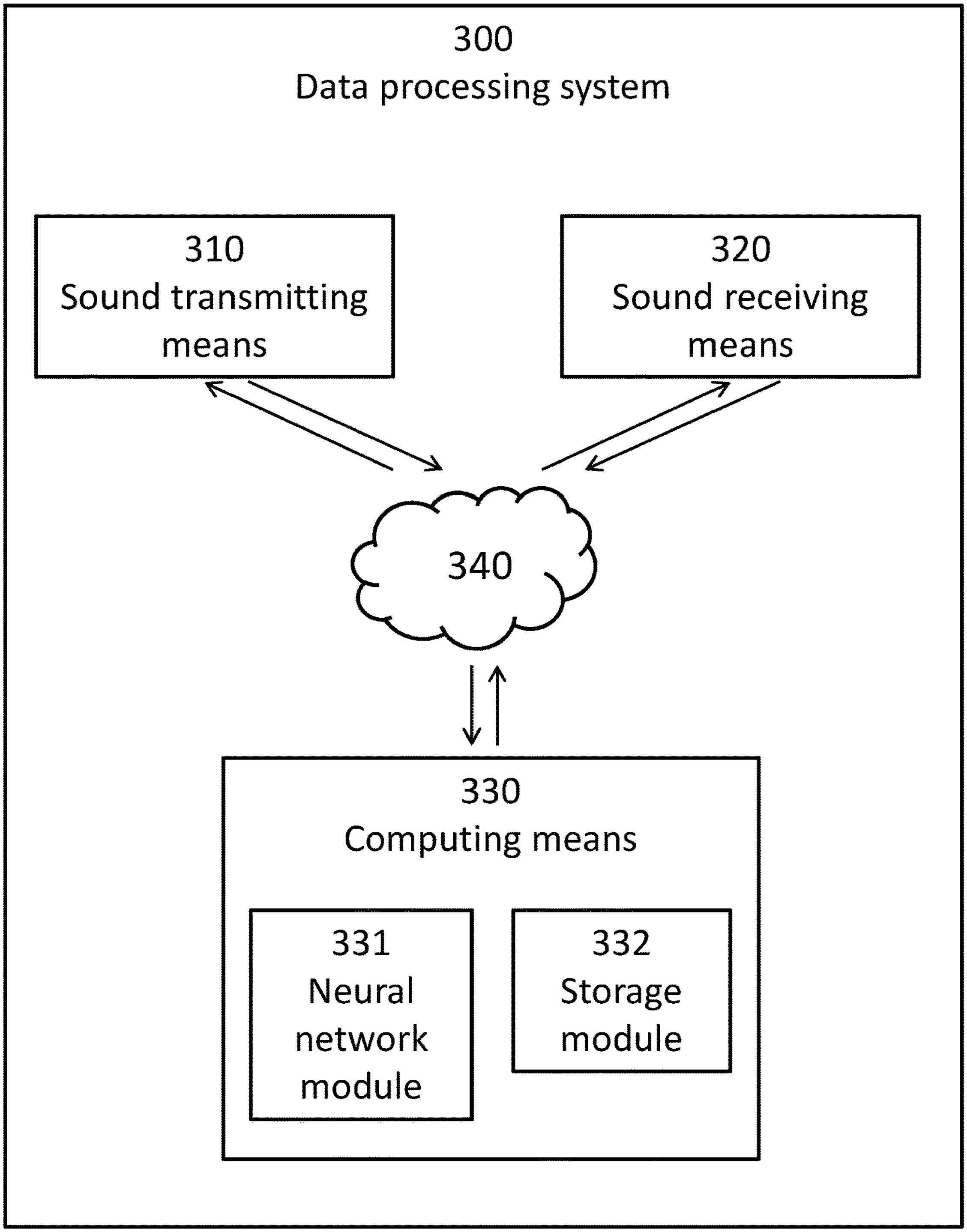
FIG. 3 shows a structural diagram of a data processing system configured to generate a personalised sound signal transfer function.

FIG. 3 shows a data processing system configured to perform the method 100. The data processing system 300 comprises a sound transmitting means 310, a sound receiving means 320 and a computing means 330. The computing means 330 comprises a neural network module 331 and a storage module 332.

The sound transmitting means 310 is configured to be located within the far field or free field relative to a user's ear. The sound transmitting means 310 may be loudspeakers located around the user.

The sound receiving means 320 is configured to be located within the near field relative to the user's ear, in particular in the user's ear, i.e., in the user's ear canal. More particularly, the sound receiving means is configured to be located or positioned in proximity of the pinnae of the user's ear, preferably in proximity of the eardrum of the user's ear. Alternatively, the sound receiving means can be positioned at or in proximity of the user's ear. The sound receiving means 320 may be a microphone.

The computer means 330 may be separate from or comprised by sound transmitting means 310. The sound transmitting means 310 and the sound receiving means 320 are communicatively coupled to the computing means 330, e.g. via a wired connection and/or a wireless connection, for example via a server 340. Likewise, the sound transmitting means 310 may be communicatively coupled to the sound receiving means 320, directly and/or via the server 340.

A sound signal to be transmitted by the sound transmitting means 310 is communicated between the sound transmitting means 310 and the computing means 330. A sound signal received by the sound receiving means 320 is communicated between the sound receiving means 320 and the computing means 330.

Figure 4:
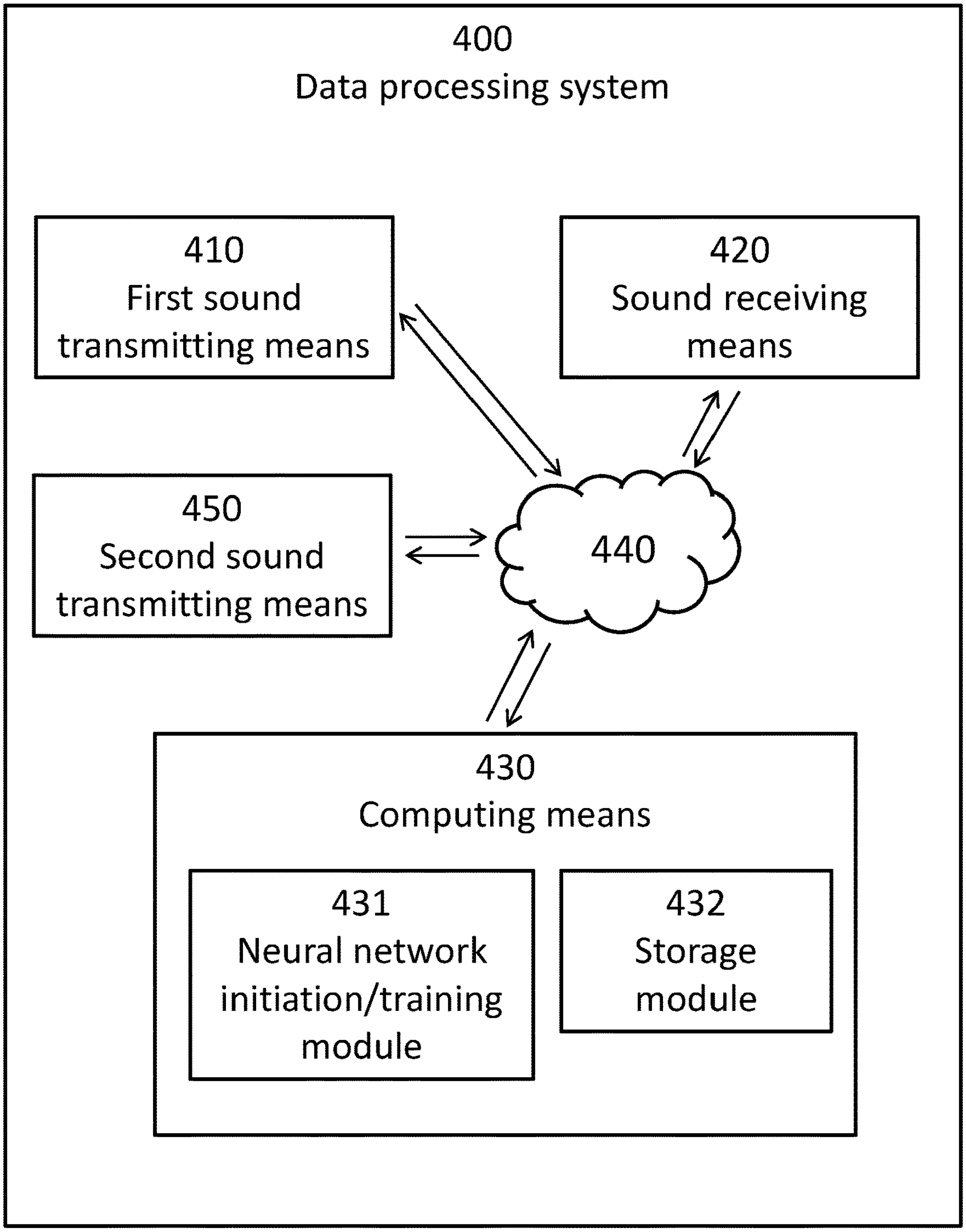
FIG. 4 shows structural diagram of a data processing system configured to initiate and/or train a neural network model.

FIG. 4 shows a data processing system 400 configured to perform the method 200. The data processing system 400 comprises a first sound transmitting means 410, a second sound transmitting means 450, a sound receiving means 420 and a computing means 430. The computing means 430 comprises a neural network initiation/training module 431 and a storage module 432.

The first sound transmitting means 410 may be equal or similar to the sound transmitting means 310 of data processing system 300. The first sound transmitting means 410 is configured to be located within the far field preferably in the free field or the approximate free field relative to a user's ear. The first sound transmitting means 410 may be one or more loudspeakers positioned around the user, e.g., in a laboratory environment, such as an anechoic room.

The second sound transmitting means 450 is configured to be located within the far field, preferably in the free field or the approximate free field relative to a user's ear. The second sound transmitting means 450 may be one or more loudspeakers positioned around the user, e.g., in a laboratory environment, such as an anechoic room.

The sound receiving means 420 may be equal or similar to the sound receiving means 320 of data processing system 300. These sound receiving means 420 is configured to be located within the near field relative to the user's ear, in particular in the user's ear, i.e., in the user's ear canal. More particularly, the sound receiving means is configured to be located or positioned in proximity of the pinnae of the user's ear, preferably in proximity of the eardrum of the user's ear. Alternatively, the sound receiving means can be positioned at or in proximity of the user's ear. The sound receiving means 420 may be a microphone.

The first and second sound transmitting means 410, 450 and the sound receiving means 420 are communicatively coupled to the computing means 430, e.g. via a wired connection and/or a wireless connection, for example via a server 440. Likewise, the first and second sound transmitting means 410, 450 and/or the sound receiving means 420, may each be communicatively coupled to at least one of the other components of the data processing system 400 directly and/or indirectly, e.g., via the server 440.

The invention claimed is:

1. A computer implemented method for generating a personalized sound signal transfer function, the method comprising:

determining first data, wherein the first data represents a first sound signal transfer function, wherein the first sound signal transfer function is extracted from a first sound signal received from a sound source, and wherein the first sound signal transfer function is associated with an ear of a user and with a first sound signal direction relative to the ear of the user; and determining, based on the first data, second data, wherein the second data represents a second sound signal transfer function, wherein the second sound signal transfer function is associated with the ear of the user and with a second sound signal direction relative to the ear of the user.

2. The computer implemented method of claim 1, further comprising receiving, by a sound receiver, a sound signal at or in the ear of the user, wherein determining the first data is based on the received sound signal.

3. The computer implemented method of claim 1 wherein:

the first sound signal transfer function represents a first far field or a first free field sound signal transfer function associated with the first sound signal direction; or the method further comprises receiving the first sound signal from the first sound signal direction or a first sound transmitter located in the first sound signal direction within a far field or free field relative to the ear of the user.

4. The computer implemented method of claim 1, wherein the second sound signal transfer function represents a second far field or a second free field sound signal transfer function.

5. The computer implemented method of claim 1, further comprising at least one of:

prior to receiving the first sound signal, transmitting, by a sound transmitter, the first sound signal; or determining, based on the second data, a filter function for modifying the first sound signal or a subsequent sound signal; or modifying the first sound signal or the subsequent sound signal and transmitting, by the sound transmitter, the modified first sound signal or the modified subsequent sound signal.

6. The computer implemented method of claim 1, further comprising determining third data, wherein the third data is indicative of at least one of the first sound signal direction or the second sound signal direction in relation to the ear of the user, wherein determining the second data is further based on the third data.

7. The computer implemented method of claim 6, wherein:

the second data is determined using a regression algorithm, wherein the regression algorithm is one of an artificial intelligence-based, machine learning-based, or neural network model-based regression algorithm; and at least one of the first data or the third data is used as inputs to the regression algorithm.

8. The computer implemented method of claim 7, further comprising:

determining a training data set, wherein the training data set comprises a plurality of first training data and a plurality of second training data; and initiating, training, or initiating and training the regression algorithm, based on the training data set, to output a second sound signal transfer function associated with an ear of a user based on an input first sound signal transfer function associated with the ear of the user;

wherein each of the plurality of first training data represents a respective first training sound signal transfer function associated with an ear of a training subject or an ear of a respective training subject; and wherein each of the plurality of second training data represents a respective second training sound signal transfer function associated with the ear of the training subject or the ear of the respective training subject.

9. A computer implemented method for initiating and/or training a regression algorithm, wherein the regression algorithms is an artificial intelligence-based, machine learning-based, or neural network-based regression algorithm, the method comprising:

determining a training data set, wherein the training data set comprises a plurality of first training data and a plurality of second training data; and initiating, training, or initiating and training the regression algorithm, based on the training data set, to output a second sound signal transfer function associated with an ear of a user based on an input first sound signal transfer function associated with the ear of the user;

wherein each of the plurality of first training data represents a respective first training sound signal transfer function associated with an ear of a training subject or an ear of a respective training subject; and wherein each of the plurality of second training data represents a respective second training sound signal transfer function associated with the ear of the training subject or the ear of the respective training subject.

10. The computer implemented method of claim 9, wherein:

each of the respective first training sound signal transfer functions represents a respective first far field or free field sound signal transfer function associated with a first training sound signal direction or a respective first training sound signal direction; and the input first sound signal transfer function represents an input first far field or first free field sound signal transfer function associated with an input first sound signal direction.

11. The computer implemented method of claim 10, wherein:

each of the respective second training sound signal transfer functions represents a respective second far field or free field sound signal transfer function associated with a second training sound signal direction or a respective second training sound signal direction; and the output second sound signal transfer function represents an output second far field or second free field sound signal transfer function associated with an input second sound signal direction.

12. The computer implemented method of claim 11, wherein:

the training data set further comprises third training data;

the third training data is indicative of at least one of the first training sound signal direction, the respective first training sound signal direction, or the second training sound signal direction, or the respective second training sound signal direction; and initiating, training, or initiating and training the regression algorithm to output the second sound signal transfer function is further based on at least one of the input first sound signal direction or the input second sound signal direction.

13. The computer implemented method of claim 12, wherein the third training data comprises:

first vector data being indicative of at least one of the first training sound signal directions or the second training sound signal directions; and second vector data, wherein the second vector data is dependent on or derived from the first vector data.

14. The computer implemented method of claim 9, further comprising:

receiving a plurality of first training sound signals in or at the ear of the training subject from a respective first sound transmitter located in the respective first training sound signal direction within a first far field or a first free field relative to the ear of the respective training subject and determining, based on each of the received plurality of first training sound signals, the respective first training sound signal transfer functions; or receiving the respective second training sound signal in or at the ear of the respective training subject from a respective second sound transmitter located in the respective second training sound signal direction within a second far field or a second free field relative to the ear of the respective training subject and determining, based on each of a received plurality of second training sound signals, the respective second training sound signal transfer functions.

15. A non-transitory computer-readable storage medium comprising instructions which, when executed by a data processing system, cause the data processing system to carry out a method comprising:

determining first data, wherein the first data represents a first sound signal transfer function, wherein the first sound signal transfer function is extracted from a first sound signal received from a sound source, and wherein the first sound signal transfer function is associated with an ear of a user and with a first sound signal direction relative to the ear of the user; and determining, based on the first data, second data, wherein the second data represents a second sound signal transfer function, wherein the second sound signal transfer function is associated with the ear of the user and with a second sound signal direction relative to the ear of the user.

16. The non-transitory computer-readable storage medium of claim 15, wherein the method further comprises receiving, by a sound receiver, a sound signal at or in the ear of the user, wherein determining the first data is based on the received sound signal.

17. The non-transitory computer-readable storage medium of claim 15, wherein:

the first sound signal transfer function represents a first far field or a first free field sound signal transfer function associated with the first sound signal direction; or the method further comprises receiving the first sound signal from the first sound signal direction or a first sound transmitter located in the first sound signal direction within a far field or free field relative to the ear of the user.

18. The non-transitory computer-readable storage medium of claim 15, wherein the second sound signal transfer function represents a second far field or a second free field sound signal transfer function.

19. The non-transitory computer-readable storage medium of claim 15, wherein the method further comprises:

prior to receiving the first sound signal, transmitting, by a sound transmitter, the first sound signal; or determining, based on the second data, a filter function for modifying the first sound signal or a subsequent sound signal; and modifying the first sound signal or the subsequent sound signal and transmitting, using the sound transmitter, the modified first sound signal or the modified subsequent sound signal.

20. The non-transitory computer-readable storage medium of claim 15, wherein:

the method further comprises determining third data, wherein the third data is indicative of at least one of the first sound signal direction or the second sound signal direction in relation to the ear of the user, wherein determining the second data is further based on the third data;

the second data is determined using a regression algorithm, wherein the regression algorithm is one of an artificial intelligence-based, machine learning-based, or neural network model-based regression algorithm; and at least one of the first data or the third data is used as inputs to the regression algorithm.

* * * * *